United States Patent [19]

Götzenberger

[11] 4,131,128

[45] Dec. 26, 1978

[54] CONTROL VALVE

[75] Inventor: Rudibert Götzenberger, Neckarrems, Fed. Rep. of Germany

[73] Assignee: Ernst Flitsch GmbH U. Co., Fellbach, Fed. Rep. of Germany

[21] Appl. No.: 783,663

[22] Filed: Apr. 1, 1977

[30] Foreign Application Priority Data

Apr. 7, 1976 [DE] Fed. Rep. of Germany ....... 2615009

[51] Int. Cl.² .......................... F16K 31/04; F16K 5/10
[52] U.S. Cl. ..................................... 137/556; 251/185; 251/209; 251/134
[58] Field of Search ............... 251/209, 185, 208, 134; 137/556, 556.3

[56] References Cited

U.S. PATENT DOCUMENTS

| | | | |
|---|---|---|---|
| 1,755,057 | 4/1930 | Fagan et al. .......................... | 137/556 |
| 3,248,080 | 4/1966 | Plasko .................................. | 251/185 |
| 3,308,850 | 3/1967 | Gill ..................................... | 251/185 X |
| 3,536,296 | 10/1970 | Burris .................................. | 251/208 |
| 3,653,406 | 4/1972 | Racki ................................... | 251/185 X |
| 3,722,545 | 3/1973 | Furlani ................................ | 251/209 X |
| 4,046,350 | 9/1977 | Massey et al. ...................... | 137/556 X |

*Primary Examiner*—Arnold Rosenthal
*Attorney, Agent, or Firm*—Hans Berman

[57] ABSTRACT

A control valve particularly suitable for service in mechanical refrigeration systems has a spherical valve body permanently engaging an annular seal and is operated by turning the valve body about an axis perpendicular to the direction of fluid flow through the central opening in the valve seat. A circumferentially flaring notch in the outer circumference of the valve member by-passes the valve seat in the open angular position of the valve member and communicates only with the inlet or the outlet of the valve in the closed valve position.

9 Claims, 4 Drawing Figures

CONTROL VALVE

This invention relates to control valves, and particularly to a valve suitable for controlling the flow of liquids, vapors, and their mixtures, as they occur in mechanical refrigeration systems.

The relatively simple needle valves and cone valves available for controlling refrigerant lines tend to cause vibrations and cavitation in a liquid whose flow it is desired to control. The known valves which avoid such shortcomings are relatively complex and costly.

An important object of this invention is the provision of a simple control valve suitable for controlling the flow of a fluid under high pressure in precisely metered increments while avoiding the shortcomings of other simple valves.

The valve of the invention basically is a ball valve whose spherical valve member engages an annular valve seat in the valve casing and is turned about an axis perpendicular to the direction of fluid flow through the valve seat between two angular positions. The valve member of the invention differs from that of conventional ball valves by having a solid center and being formed with a circumferentially elongated notch in a plane through the center perpendicular to the afore-mentioned axis. In one of the angular positions of the valve member, the notch simultaneously communicates with the inlet and outlet conduits of the casing. In the other angular position of the valve member, the notch communicates with not more than one of the conduits, and the valve is closed.

Other features, additional objects, and many of the attendant advantages of this invention will readily be appreciated as the same becomes better understood by reference to the following detailed description of a preferred embodiment when considered in connection with the appended drawing in which.

Figure 1:
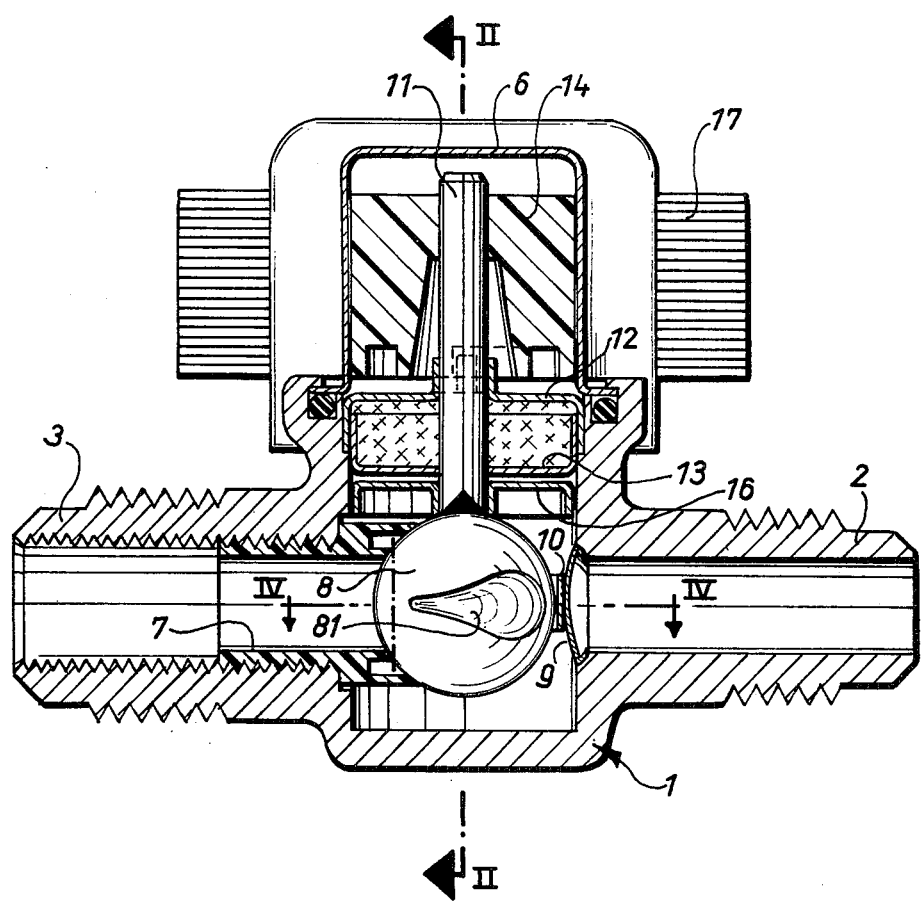
FIG. 1 shows a valve of the invention in elevational section.
Figure 4:
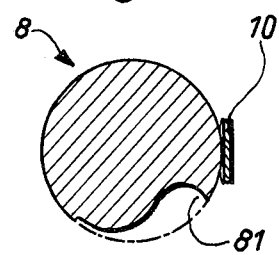
FIG. 4 shows the spherical valve member of the valve and an associated pressure plate in section on the line IV—IV in FIG. 1.

The body portion 1 of the casing is a metal casting integral with an externally threaded inlet nipple 2 and an outlet nipple 3, externally and internally threaded and coaxial with the inlet nipple 2. The central cavity of the casing body 1 has a side window 4 sealed by a heavy sight glass 5. The open top of the casing cavity is sealed by a flanged cover 6 of austenitic stainless steel or other non-magnetic material which has the shape of an inverted cup.

A sleeve 7 is threadedly received in the outlet nipple 3, and its enlarged end portion in the central casing cavity provides an annular valve seat for a spherical valve member or ball 8. The ball 8 is held in sealing engagement with the valve seat on the sleeve 7 by a flat pressure plate 10 biased into point contact with the spherical outer surface of the ball 8 by a spring clip 9 abuttingly retained in the inner orifice of the inlet nipple 2.

The ball 8 may be turned by means of a fixedly attached stem 11 about an axis which intersects the common axis of the nipples 2, 3 and of the sleeve 7 at right angles in the geometrical center of the ball 8. The otherwise continuously spherical, outer face of the ball 8 is formed with a notch 81 elongated in a plane perpendicular to the axis of the stem 11 through the ball center. In the open position of the valve, the notch 81 has a narrow and shallow longitudinal end communicating with the outlet nipple 3. It flares longitudinally both in its width and its depth, and its other end communicates with the central cavity of the casing body 1 and the inlet nipple 2. The notch 81 is symmetrical relative to the afore-mentioned perpendicular plane and extends about an approximate arc of 90° of the ball circumference.

The stem 11 is journaled in a central sleeve portion of a disk 12 having a circumferential flange axially directed toward the ball 8. It envelops an axial flange of another disk 13, spacedly parallel to the disk 12 and passed by the stem 11. The disks 12, 13 thus form a flat cylindrical box packed with asbestos fibers which filter particulate solids from the fluid controlled by the valve and prevent contamination of the bearing for the stem 11 in the sleeve portion of the disk 12. The box 12, 13 is fixedly secured in the casing body 1 by a tight friction fit.

Figure 3:
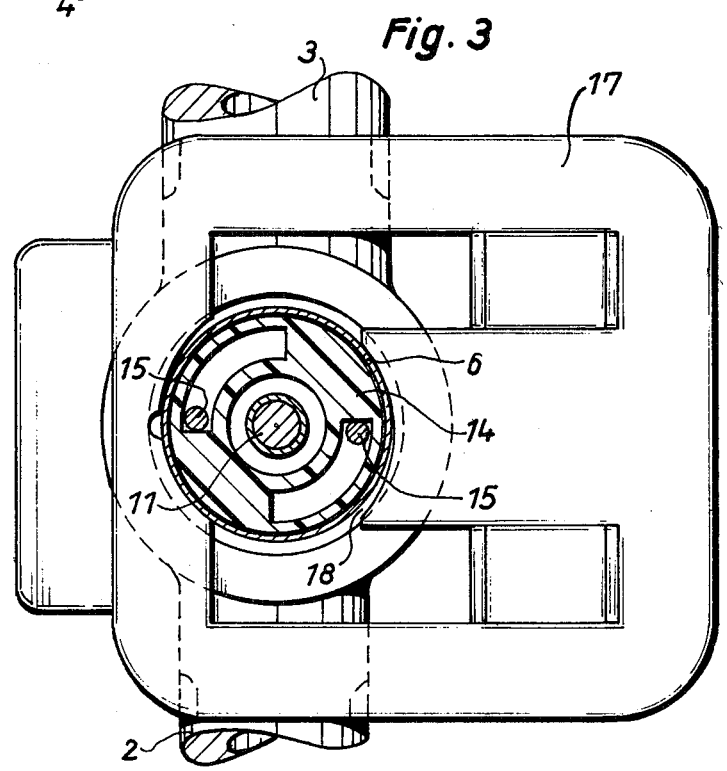
FIG. 3 is a sectional view of the same valve taken on the line III—III in FIG. 2.

An armature 20 of mild steel is mounted on the portion of the stem 11 which extends into the cover 6 and is embedded in a cylindrical body 14 of plastic rotatably engaged by the cover 6. Two axial, eccentric pins 15 fixedly fastened on the disk 12 project into respective grooves of the plastic body 14. As is best seen in FIG. 3, the grooves each extend in an arc of about 90° about the axis of the stem 11, and the angular, joint movement of the plastic body 14, the armature 20, the stem 11, and the ball 8 is limited by abutting engagement of the pins 15 with the transverse end walls of the grooves.

Figure 2:
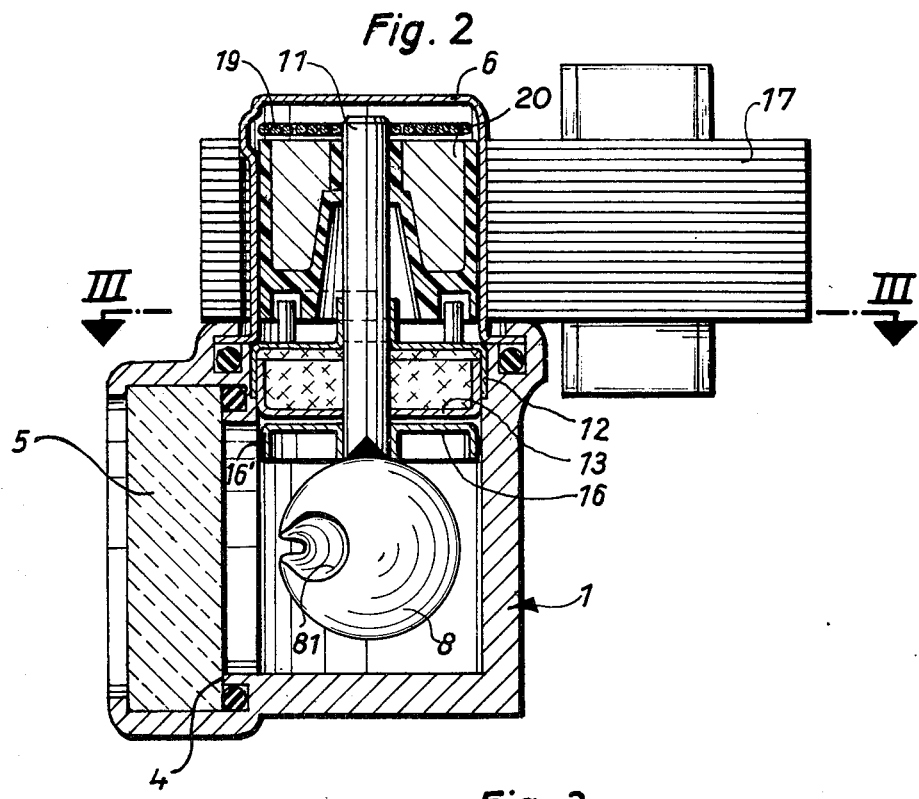
FIG. 2 illustrates the valve in section on the line II—II.

A plate 16 has an integral, central hub portion frictionally secured on the stem 11 between the ball 8 and the box 12,13. A circumferential, depending skirt portion of the plate 16 carries a row of embossed indicia 16' of which only one is visible in FIG. 2. The indicia may be viewed through the sight glass 5 and give a precise indication of the angular position of the ball 8 and of the effective flow section of the notch 81.

The ball 8 may be turned by means of an electromagnet of which only the lamellar core 17 is shown in the drawing. The energizing wire windings enveloping one pole of the magnet core have been omitted in order not to crowd the drawing. A gap 18 between the cylindrical circumference of the cover 6 (FIG. 3) and the one magnet pole normally carrying the windings or coil of the magnet decreases in width from one circumferential end to the other so that the stem 11 is turned in one direction only when the magnet is energized in a conventional manner, not shown. When the current flow to the magnet is interrupted, the ball 8 is returned to its initial angular position by a spiral spring 19 of non-magnetic phosphor bronze wire whose ends are fastened to the stem 11 and the inner face of the cover 6 respectively. Depending on the intended application, the spring 19 may bias the ball 8 and the stem 11 toward the open or closed valve position, the other valve position being reached by energizing the electromagnet which overcomes the restraint of the spring 19 omitted from FIG. 2 for the sake of clarity.

The illustrated valve is capable of many modifications which will readily suggest themselves to those skilled in the art. While a single notch 81 is preferred and adequate for refrigeration service, two diametrically opposite notches may be provided as long as the ball 8 has a solid portion extending from the geometrical center of the ball in all directions over a radius at least equal to the spacing of the illustrated notch 81 from the ball center.

The spring 19 may be replaced by a permanent magnet mounted on the stem 11 in the plastic body 14. The permanent magnet (not shown) may be positioned in an obvious manner to return the ball 8 to its starting position after deflection by the electromagnet.

The energizing circuit of the partly illustrated electromagnet has not been shown since it may be entirely conventional. It may include temperature responsive elements which control the current flowing through the non-illustrated coil of the electromagnet in response to changes in the temperature of a refrigerated space or object.

It should be understood, therefore, that the foregoing disclosure relates only to a preferred embodiment, and that it is intended to cover all changes and variations in the example of the invention herein chosen for the purpose of the disclosure which do not constitute departures from the spirit and scope of the appended claims.

What is claimed is:

1. A control valve comprising:
   (a) a casing defining an inlet conduit, a chamber, and an outlet conduit jointly constituting a flow path through said casing;
   (b) an annular valve seat in said chamber formed with an opening therethrough, said flow path extending through said opening in a predetermined direction;
   (c) a spherical valve member mounted in said cavity in movable engagement with said valve seat;
   (d) operating means for moving said valve member about an axis transverse to said predetermined direction between two angularly spaced positions.
      (1) the spherical outer face of said valve member being formed with a notch elongated in a plane perpendicular to said axis through the center of said valve member,
      (2) said notch flaring in the direction of elongation thereof,
      (3) said notch in one of said positions of said valve member communicating simultaneously with said inlet and outlet conduits,
      (4) said notch in the other position of said valve member communicating with not more than one of said conduits; and
   (e) yieldably resilient means in said cavity pressing said valve member toward said valve seat, said yieldably resilient means including,
      (1) a pressure plate making contact with said circumference in said one position of said valve member substantially in a point only, and
      (2) a spring interposed between said casing and said pressure plate.

2. A valve as set forth in claim 1, wherein said notch is symmetrical relative to said plane, said axis passing through said center.

3. A valve as set forth in claim 1, wherein said operating means include a stem journaled in said casing and fixedly fastened to said valve member for joint angular movement about said axis, biasing means biasing said stem and said valve member toward one of said positions of the valve member, and electrically operated means operatively connected to said stem for moving said valve member into the other one of said positions thereof against the restraint of said biasing means.

4. A valve as set forth in claim 3, wherein said electrically operated means are located outside said casing.

5. A valve as set forth in claim 4, wherein said electrically operated means include an electromagnet having a core, said stem carrying an armature, said core and said armature defining a gap therebetween, said gap being elongated circumferentially relative to said axis and flaring in a longitudinal direction.

6. A valve as set forth in claim 1, further comprising cooperating abutment means on said valve member and on said casing for preventing angular movement of said valve member beyond said two positions thereof.

7. A valve as set forth in claim 4, further comprising an arcuate scale connected to said valve member in said casing for joint angular movement about said axis, said casing having a transparent wall portion, said scale being visible from outside said casing through said wall portion.

8. A valve as set forth in claim 1, wherein said valve member has a solid portion extending from said center in all directions over a radius at least equal to the spacing of said notch from said center.

9. A valve as set forth in claim 7, wherein said electrically operated means include an armature mounted on said stem, said stem and said armature being enclosed in said casing, and said electrically operated means outside said casing include an electromagnet having a core.

* * * * *